(12) United States Patent
Nakamura et al.

(10) Patent No.: US 7,999,019 B2
(45) Date of Patent: Aug. 16, 2011

(54) GOLF BALL

(75) Inventors: Hirotaka Nakamura, Kobe (JP); Keiji Ohama, Kobe (JP)

(73) Assignee: SRI Sports Limited, Kobe (JP)

( * ) Notice: Subject to any disclaimer, the term of this patent is extended or adjusted under 35 U.S.C. 154(b) by 407 days.

(21) Appl. No.: 12/222,511

(22) Filed: Aug. 11, 2008

(65) Prior Publication Data
US 2009/0075759 A1    Mar. 19, 2009

(30) Foreign Application Priority Data

Sep. 14, 2007 (JP) ................................ 2007-238729

(51) Int. Cl.
A63B 37/12 (2006.01)
A63B 37/00 (2006.01)
C08L 75/08 (2006.01)
C08K 5/3435 (2006.01)

(52) U.S. Cl. ............. 524/91; 524/99; 524/102; 473/378

(58) Field of Classification Search .......................... None
See application file for complete search history.

(56) References Cited

U.S. PATENT DOCUMENTS

| | | | |
|---|---|---|---|
| 4,935,275 A * | 6/1990 | Ushida et al. ................... | 428/31 |
| 5,156,405 A | 10/1992 | Kitaoh et al. | |
| 5,359,129 A * | 10/1994 | Shimizu et al. ............... | 560/332 |
| 6,716,116 B1 | 4/2004 | Yokota et al. | |
| 2002/0086743 A1 | 7/2002 | Bulpett et al. | |
| 2003/0069087 A1 * | 4/2003 | Ichikawa et al. .............. | 473/378 |
| 2004/0018895 A1 | 1/2004 | Bulpett et al. | |
| 2006/0142441 A1 * | 6/2006 | Chan et al. ..................... | 524/100 |
| 2007/0082990 A1 | 4/2007 | Bulpett et al. | |

FOREIGN PATENT DOCUMENTS

| | | | |
|---|---|---|---|
| JP | 64-70086 A | | 3/1989 |
| JP | 2001-17576 A | | 1/2001 |
| WO | WO 2005/047384 | * | 5/2005 |
| WO | WO 2006/003092 | * | 1/2006 |

* cited by examiner

*Primary Examiner* — David Buttner
(74) *Attorney, Agent, or Firm* — Birch, Stewart, Kolasch & Birch, LLP

(57) ABSTRACT

Golf ball 2 has core 4, cover 6 and paint layer 12. The base polymer of the cover 6 includes a thermoplastic polyurethane elastomer. The cover includes 0.1 parts by weight or more and 10 parts by weight or less of a hindered amine heat and light resistance stabilizer having a hindered phenol group, per 100 parts by weight of the base polymer. Preferably, the hindered amine heat and light resistance stabilizer has two or more hindered phenol groups in the molecule. It is preferred that the cover 6 further includes an ultraviolet ray absorbing agent and a heat resistance stabilizer. Provided that the molar concentration of the hindered amine heat and light resistance stabilizer is defined as A, and the molar concentration of the ultraviolet ray absorbing agent is defined as B, the molar ratio (A/B) is preferably 0.01 or greater and 2.5 or less. The cover 6 may further include a heat resistance stabilizer.

13 Claims, 1 Drawing Sheet

ID1
GOLF BALL

This application claims priority on Patent Application No. 2007-238729 filed in JAPAN on Sep. 14, 2007. The entire contents of this Japanese Patent Application are hereby incorporated by reference.

BACKGROUND OF THE INVENTION

1. Field of the Invention

The present invention relates to golf balls in which an urethane based resin is used in the cover.

2. Description of the Related Art

Golf balls in which an urethane resin is used in the cover have been developed. These golf balls are excellent in performances in approach and scuff resistance. These golf balls are likely to be preferred by high-level golf players. Also, the golf balls in which an urethane resin is used in the cover may be employed as balls for golf practice range (generally, may be also referred to as "range ball"). In particular, in the case of use as the ball for golf practice range, durability in repeated use and in use for a long period of time is demanded.

As described above, the golf balls having an urethane cover are excellent in the scuff resistance performance, therefore, scuffing and breakage are less likely to be caused even though they are repeatedly used in golf practice range and the like. To the contrary, the urethane resin is more likely to subject to color change by ultraviolet rays as compared with ionomer resins. The golf balls having an urethane cover are more likely to subject to color change by use for a long period of time. Particularly, the color change causes problems in the case of the balls for golf practice range.

Techniques in which an ultraviolet ray absorbing agent is included in the cover or paint were proposed in order to inhibit influences from the ultraviolet rays. Japanese Unexamined Patent Application Publication No. Sho 64-70086 (U.S. Pat. No. 5,156,405) discloses a golf ball in which an ultraviolet ray absorbing agent is included in a cover constituted with an ionomer resin, and in a clear paint. Japanese Unexamined Patent Application Publication No. 2002-159596 (United States Patent Application Publication No. 2002/086743 A1, and United States Patent Application Publication No. 2004/018895 A1, United States Patent Application Publication No. 2007/082990 A1) disclose a golf ball in which the cover includes an UV absorbing agent or a light stabilizer as a color stabilizer. Japanese Unexamined Patent Application Publication No. 2001-17576 (U.S. Pat. No. 6,716,116) discloses a one piece golf ball having a clear coat and a ball main body, with the clear coat including an ultraviolet ray absorbing agent, an antioxidant and a light stabilizer. According to this golf ball, weathering color change likelihood of the ball main body constituted with a white rubber composition is reduced.

SUMMARY OF THE INVENTION

There is still potential for reduction of the weathering color change likelihood of the urethane covers. As a result of investigation, it was proven that the color change of the urethane cover could be effectively inhibited by blending a heat and light resistance stabilizer in the cover, in which a hindered amine heat and light resistance stabilizer having a hindered phenol group is used as this heat and light resistance stabilizer. An object of the present invention is to provide a golf ball which can improve the weather resistance of the cover in which an urethane based resin is used.

The golf ball according to the present invention has a core and a cover. The base polymer of the cover includes a thermoplastic polyurethane elastomer. The cover includes 0.1 parts by weight or more and 10 parts by weight or less of a hindered amine heat and light resistance stabilizer having a hindered phenol group, per 100 parts by weight of the base polymer.

Preferably, the hindered amine heat and light resistance stabilizer has two or more hindered phenol groups in the molecule.

Preferably, the cover further includes an ultraviolet ray absorbing agent and a heat resistance stabilizer. Preferably, provided that: the molar concentration of the hindered amine heat and light resistance stabilizer is defined as A; the molar concentration of the ultraviolet ray absorbing agent is defined as B; and the molar concentration of the heat resistance stabilizer is defined as C, the molar ratio (A/B) is 0.01 or greater and 2.5 or less, while the molar ratio [(A+C)/B] is 0.01 or greater and 2.5 or less.

Preferably, the principal component of the thermoplastic polyurethane elastomer is a reaction product of diphenylmethane diisocyanate (MDI) and polyether polyol.

Preferably, the cover includes 0.01 parts by weight or more and 10 parts by weight or less of the ultraviolet ray absorbing agent per 100 parts by weight of the base polymer.

Preferably, the ultraviolet ray absorbing agent is a benzotriazole based agent.

Preferably, the heat resistance stabilizer is a hindered phenol based agent.

Preferably, the hindered amine heat and light resistance stabilizer is 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine.

By using the specified heat and light resistance stabilizer, weather resistance of the urethane resin that constitutes the cover can be effectively improved.

DESCRIPTION OF THE PREFERRED EMBODIMENTS

Figure 1:
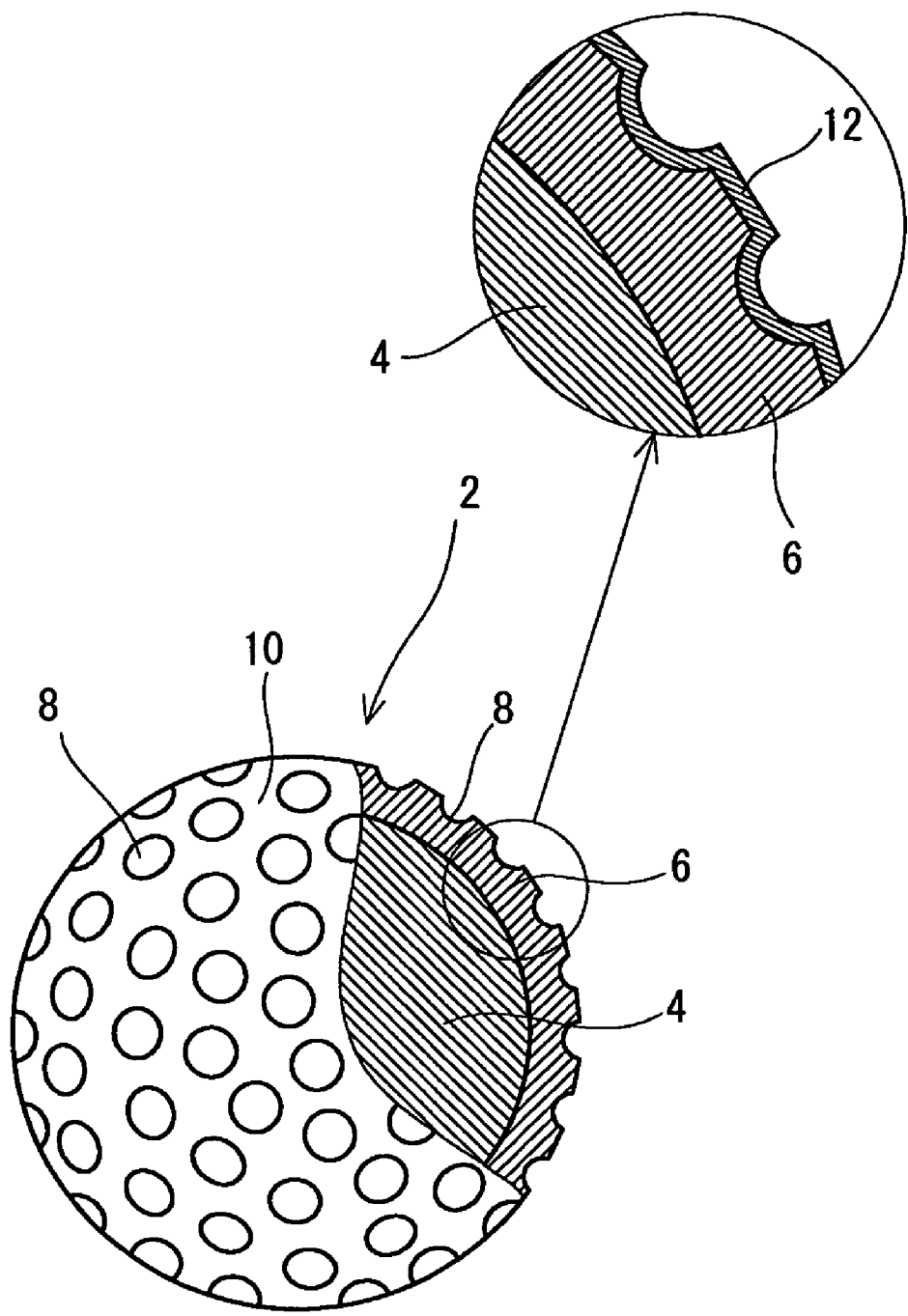
FIG. 1 shows a schematic cross-sectional view illustrating a golf ball according to one embodiment of the present invention.

Hereinafter, the present invention will be described in detail according to the preferred embodiments with appropriate references to the accompanying drawing.

Golf ball 2 shown in FIG. 1 has spherical core 4, and cover 6 provided so as to cover this core 4. Numerous dimples 8 are formed on the surface of the cover 6. Of the surface of the golf ball 2, a part except for the dimples 8 is land 10. This golf ball 2 has paint layer 12 on the external side of the cover 6. The paint layer 12 abuts on the cover 6. The paint layer 12 is coated on the external surface of the cover 6. The paint layer 12 covers the entirety of the surface of the cover 6. A mark layer is provided on the external side of the cover 6, although this mark layer is not shown in the Figure.

In the present invention, the cover 6 means an outermost layer except for the paint layer 12 and the mark layer. Although there exist golf balls referred to as including a cover having a two-layered structure, in this case, the external side layer alone corresponds to the cover 6 in the present invention. The mid layer described later corresponds to the core 4 in the present invention.

This golf ball 2 has a diameter of from 40 mm to 45 mm. From the standpoint of conformity to a rule defined by United States Golf Association (USGA), the diameter is more preferably equal to or greater than 42.67 mm. In light of suppression of the air resistance, the diameter is more preferably equal to or less than 44 mm, and particularly preferably equal to or less than 42.80 mm. The weight of this golf ball 2 is 40 g or greater and 50 g or less. In light of attainment of great inertia, the weight is more preferably equal to or greater than 44 g, and particularly preferably equal to or greater than 45.00 g. From the standpoint of conformity to a rule defined by USGA, the weight is preferably equal to or less than 45.93 g.

The core 4 is formed by crosslinking a rubber composition. Illustrative examples of the base rubber for use in the rubber composition include polybutadienes, polyisoprenes, styrene-butadiene copolymers, ethylene-propylene-diene copolymers and natural rubbers. In light of the resilience performance, polybutadienes are preferred. When other rubber is used in combination with polybutadiene, it is preferred that the polybutadiene is included as a principal component. Specifically, it is preferred that percentage of polybutadiene occupying the entire base rubber is equal to or greater than 50% by weight, and particularly equal to or greater than 80% by weight. Polybutadienes having a percentage of cis-1,4 bonds of equal to or greater than 40% by mole, and further, equal to or greater than 80% by mole are preferred.

The rubber composition for the core 4 includes a co-crosslinking agent. Preferable examples of the co-crosslinking agent in light of the resilience performance include monovalent or bivalent metal salts of an $\alpha,\beta$-unsaturated carboxylic acid having 2 to 8 carbon atoms. Specific examples of the preferable co-crosslinking agent include zinc acrylate, magnesium acrylate, zinc methacrylate and magnesium methacrylate. Zinc acrylate and zinc methacrylate are particularly preferred on the grounds that a high resilience performance can be achieved.

As a co-crosslinking agent, an $\alpha,\beta$-unsaturated carboxylic acid having 2 to 8 carbon atoms, and a metal oxide may be also blended. Both components react in the rubber composition to give a salt. This salt is responsible for the crosslinking reaction. Examples of preferable $\alpha,\beta$-unsaturated carboxylic acid include acrylic acid and methacrylic acid. Examples of preferable metal oxide include zinc oxide and magnesium oxide.

The amount of the blended co-crosslinking agent is preferably 10 parts by weight or greater and 50 parts by weight or less per 100 parts by weight of the base rubber. By setting amount to be equal to or greater than 10 parts by weight, excellent resilience performance can be achieved. In this respect, the amount is more preferably equal to or greater than 15 parts by weight, and particularly preferably equal to or greater than 20 parts by weight. By setting the amount to be equal to or less than 50 parts by weight, excellent feel at impact can be achieved. In this respect, the amount is more preferably equal to or less than 45 parts by weight, and particularly preferably equal to or less than 35 parts by weight.

Preferably, the rubber composition for use in the core 4 includes organic peroxide together with the co-crosslinking agent. The organic peroxide serves as a crosslinking initiator. The organic peroxide is responsible for the resilience performance. Examples of suitable organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. Particularly versatile organic peroxide is dicumyl peroxide.

The amount of the blended organic peroxide is preferably 0.1 parts by weight or greater and 3.0 parts by weight or less per 100 parts by weight of the base rubber. By setting the amount to be equal to or greater than 0.1 parts by weight, excellent resilience performance can be achieved. In this respect, the amount is more preferably equal to or greater than 0.3 parts by weight, and particularly preferably equal to or greater than 0.5 parts by weight. By setting the amount to be equal to or less than 3.0 parts by weight, excellent feel at impact can be achieved. In this respect, the amount is more preferably equal to or less than 2.8 parts by weight, and particularly preferably equal to or less than 2.5 parts by weight.

In the core 4 may be blended a filler for the purpose of adjusting the specific gravity and the like. Illustrative examples of suitable filler include zinc oxide, barium sulfate, calcium carbonate and magnesium carbonate. Powder of a highly dense metal may be also blended as the filler. Specific examples of the highly dense metal include tungsten and molybdenum. The amount of the blended filler is determined ad libitum so that the intended specific gravity of the core 4 can be accomplished. Particularly preferable filler is zinc oxide. Zinc oxide serves not only to merely adjust the specific gravity but also as a crosslinking activator. Various kinds of additives such as sulfur, an anti-aging agent, a coloring agent, a plasticizer, a dispersant and the like may be blended in an adequate amount in the core 4 as needed. In the core 4 may be also blended crosslinked rubber powder or synthetic resin powder.

The amount of compressive deformation Ch of the core 4 is preferably equal to or less than 4.0 mm, more preferably equal to or less than 3.8 mm, and particularly preferably equal to or less than 3.5 mm. Upon hitting of the golf ball 2 with a driver, the core 4 is greatly deformed along with the cover 6. This core 4 having a small amount of compressive deformation Ch is responsible for the flight performance upon shots with a driver. When the amount of compressive deformation is too small, feel at impact may be deteriorated. In light of the feel at impact, the amount of compressive deformation Ch is more preferably equal to or greater than 2.8 mm, and particularly preferably equal to or greater than 3.0 mm.

In light of achievement of excellent resilience characteristics, the difference (Ch–Bh) between the amount of compressive deformation Ch of the core 4 and the amount of compressive deformation Bh of the ball 2 is preferably equal to or greater than 0 mm, and more preferably equal to or greater than 0.1 mm. In light of prevention of the cover from becoming excessively hard, and improvement of the durability, the difference (Ch–Bh) is preferably equal to or less than 0.4 mm, and more preferably equal to or less than 0.3 mm. In light of achievement of excellent feel at impact, the amount of compressive deformation Bh of the ball 2 is preferably equal to or greater than 2.4 mm, more preferably equal to or greater than 2.6 mm, and still more preferably equal to or greater than 2.8 mm. In light of achievement of excellent resilience characteristics, the amount of compressive deformation Bh is preferably equal to or less than 4.0 mm, more preferably equal to or less than 3.5 mm, and still more preferably equal to or less than 3.4 mm.

Upon measurement of the amount of compressive deformation (amount of compressive deformation Bh, or the amount of compressive deformation Ch), the spherical body (core 4 or ball 2) is first placed on a hard plate made of metal. Next, a cylinder made of metal gradually descends toward the spherical body. The spherical body intervened between the bottom face of the cylinder and the hard plate is deformed. A migration distance of the cylinder, starting from the state in which an initial load of 98 N is applied to the spherical body up to the state in which a final load of 1274 N is applied thereto is the amount of compressive deformation.

In light of achievement of excellent resilience characteristics, the core 4 has a diameter of preferably equal to or greater than 37.7 mm, more preferably equal to or greater than 38.3 mm, and still more preferably equal to or greater than 39.1 mm. In light of achievement of excellent durability by a great thickness of the cover, the core 4 has a diameter of preferably equal to or less than 41.5 mm, more preferably equal to or less than 41.1 mm, and still more preferably equal to or less than 40.7 mm. The core 4 has a weight of preferably 25 g or greater and 42 g or less. The crosslinking temperature of the core 4 is usually 140° C. or higher and 180° C. or lower. The crosslinking time period of the core 4 is usually 10 minutes or longer and 60 minutes or shorter. The core 4 may be composed of two or more layers.

Although not shown in the Figure, one or more mid layers may be provided between the core 4 and the cover 6. For the mid layer, a thermoplastic resin composition may be suitably used. Examples of the base polymer of this resin composition include ionomer resins, thermoplastic polyester elastomers, thermoplastic polyamide elastomers, thermoplastic polyurethane elastomers, thermoplastic polyolefin elastomers and thermoplastic polystyrene elastomers. The mid layer constituted with a thermoplastic elastomer can be melted by the heat in molding the cover, therefore, adhesiveness with the cover is likely to be improved. This improvement of the adhesiveness can improve the durability. In light of the durability, a thermoplastic elastomer is preferred. Two or more kinds of the resins may be used in combination in the mid layer.

In the resin composition of the mid layer may be blended a filler for the purpose of adjusting the specific gravity and the like. Illustrative examples of suitable filler include zinc oxide, barium sulfate, calcium carbonate and magnesium carbonate. Powder of a highly dense metal may be also blended as the filler. Specific examples of the highly dense metal include tungsten and molybdenum. The amount of the blended filler is determined ad libitum so that intended specific gravity of the mid layer can be accomplished. In the mid layer may be also blended a coloring agent, crosslinked rubber powder or synthetic resin powder.

When the mid layer is provided, this mid layer has a thickness Tm of preferably 0.3 mm or greater and 2.5 mm or less. When the thickness Tm is below the above range, the flight performance upon shots with a driver may be unsatisfactory. In this respect, the thickness Tm is more preferably equal to or greater than 0.5 mm, and particularly preferably equal to or greater than 0.7 mm. When the thickness Tm exceeds the above range, favorable feeling is less likely to be experienced upon hitting of the golf ball 2. In this respect, the thickness Tm is more preferably equal to or less than 2.0 mm.

The cover 6 is constituted with a thermoplastic resin composition. The base polymer of this resin composition includes a thermoplastic polyurethane elastomer. The thermoplastic polyurethane elastomers are soft. Great spin rate is attained upon hitting with a short iron of the golf ball having the cover including the elastomer. The cover including the elastomer is responsible for the control performance upon shots with a short iron. This elastomer is also responsible for the scuff resistance performance of the cover. In addition, this elastomer can serve in achieving excellent feel at impact upon hitting with a putter or a short iron.

The thermoplastic polyurethane elastomer includes a polyurethane component as a hard segment, and a polyester component or a polyether component as a soft segment. Illustrative examples of isocyanate as a raw material of the polyurethane component include alicyclic diisocyanate, aromatic diisocyanate and aliphatic diisocyanate. Two or more kinds of the diisocyanate may be used in combination.

Illustrative examples of the alicyclic diisocyanate include 4,4'-dicyclohexylmethane diisocyanate ($H_{12}$MDI), 1,3-bis (isocyanatomethyl) cyclohexane ($H_6$XDI), isophorone diisocyanate (IPDI) and trans-1,4-cyclohexane diisocyanate (CHDI).

Illustrative examples of the aromatic diisocyanate include diphenylmethane diisocyanate (MDI) and toluene diisocyanate (TDI). Illustrative examples of the aliphatic diisocyanate include hexamethylene diisocyanate (HDI).

Illustrative examples of diphenylmethane diisocyanate (MDI) include 4,4'-diphenylmethane diisocyanate, 2,4'-diphenylmethane diisocyanate, 2,2'-diphenylmethane diisocyanate and mixtures of these. In light of great versatility and low cost, 4,4'-diphenylmethane diisocyanate is particularly preferred.

Preferably, the thermoplastic polyurethane elastomer includes a reaction product (X) of diphenylmethane diisocyanate (MDI) and polyether polyol, as a principal component. The percentage of the reaction product (X) occupying in total base polymer of the thermoplastic polyurethane elastomer is preferably greater than 50% by weight, more preferably equal to or greater than 70% by weight, more preferably equal to or greater than 90% by weight, and particularly preferably 100% by weight.

Since diphenylmethane diisocyanate (MDI) has two benzene rings, double bonds are included in the skeleton. Thus, the thermoplastic polyurethane elastomer including the reaction product (X) as a principal component is more likely to subject to color change by the influences of the ultraviolet rays. Such a thermoplastic polyurethane elastomer is likely to generate quinoneimide, an azo compound or the like that is a coloring substance by ultraviolet rays. The generation of the quinoneimide and azo compound accounts for the color change. This color change is also referred to as yellowing. When the thermoplastic polyurethane elastomer is used, the color change is significantly problematic. According to the present invention, the color change, a disadvantage of the thermoplastic polyurethane elastomer including the reaction product (X) as a principal component, can be effectively inhibited.

Polyester based polyurethane elastomers are inferior in the water resistance, but in contrast, excellent in the heat resistance and light resistance. The polyester based polyurethane elastomer hardly achieves improvement of the heat resistance and light resistance even though the heat and light resistance stabilizer described above is added. To the contrary, the polyether based polyurethane elastomer can achieve improvement of the heat resistance and light resistance when the heat and light resistance stabilizer described above is added. In addition, the polyether based polyurethane elastomer is excellent in the water resistance.

The polyether based polyurethane elastomer is likely to subject to oxidative degradation since it has an ether bond. According to this oxidative degradation reaction, a carbon atom adjacent to an oxygen atom of the ether bond is first turned into a radical by means of light or heat, and then this radical carbon reacts with oxygen. This oxidizing reaction generates hydroperoxide, whereby this hydroperoxide turns into a radical by means of light or heat. As a consequence, the molecule is finally cleaved at the position of the ether bond, thereby generating a new radical. In this oxidative degradation reaction, a chain reaction by the radical is caused. The aforementioned heat and light resistance stabilizer can capture the radical generated in this oxidative degradation reaction. Therefore, the heat and light resistance stabilizer can inhibit the deterioration of the polyether based polyurethane elastomer.

Specific examples of the thermoplastic polyurethane elastomer include trade name "Elastolan 1195ATR", trade name "Elastolan ET890", trade name "Elastolan ET690", trade name "Elastolan 1190ATR", trade name "Elastolan XNY80A", "Elastolan XNY85A", "Elastolan XNY90A", trade name "Elastolan XNY97A", trade name "Elastolan XNY585" and trade name "Elastolan XKP016N" available from BASF Japan Ltd; and trade name "Rezamin PH2295A", trade name "Rezamin P4585LS" and trade name "Rezamin PS62490" available from Dainichiseika Color & Chemicals Mfg. Co., Ltd. In light of the possibility that a low hardness of the cover can be attained, "Elastolan 1195ATR", "Elastolan XNY80A", "Elastolan XNY85A", "Elastolan XNY90A", "Elastolan ET890", "Elastolan ET690", "Elastolan 1190ATR" and "Rezamin PH2295A" are preferred.

Among these, exemplary thermoplastic polyurethane elastomers described above including the reaction product (X) as a principal component include "Elastolan 1195ATR", "Elastolan ET890", "Elastolan ET690", "Rezamin PH2295A", and the like. In light of the antitackiness (abhesiveness) and resistance to color change, "Elastolan 1195ATR" is particularly preferred.

Other resin may be also used in combination with the thermoplastic polyurethane elastomer. Examples of the resin which can be used in combination include thermoplastic polyester elastomers, thermoplastic polyamide elastomers, thermoplastic polyolefin elastomers, styrene block-containing thermoplastic elastomers and ionomer resins. When the thermoplastic polyurethane elastomer and the other resin are used in combination, the thermoplastic polyurethane elastomer is preferably included as a principal component of the base polymer in light of the spin performance and scuff resistance performance. The percentage of the thermoplastic polyurethane elastomer occupying in total base polymer is preferably equal to or greater than 50% by weight, more preferably equal to or greater than 70% by weight, and particularly preferably equal to or greater than 85% by weight.

In addition to the heat and light resistance stabilizer, the heat resistance stabilizer and the ultraviolet ray absorbing agent described later, the cover 6 may also include an agent for adjusting the specific gravity such as barium sulfate, a dispersant, an anti-aging agent, a light stabilizer, a fluorescent brightening agent and the like.

In light of achievement of excellent resilience characteristics, the cover 6 has a material hardness (Shore D) of preferably equal to or greater than 40, and more preferably equal to or greater than 42. When the material hardness of the cover 6 is excessively great, the breakage is likely to be caused. In light of the durability, the cover 6 has a material hardness of preferably equal to or less than 55, more preferably equal to or less than 52, and further preferably equal to or less than 50.

The material hardness of the cover 6 may be measured in accordance with a standard of "ASTM-D 2240-68". For the measurement, an automated rubber hardness scale (trade name "P1", available from Koubunshi Keiki Co., Ltd.) which is equipped with a Shore D type hardness scale is used. For the measurement, a sheet formed by hot pressing to have a thickness of about 2 mm is used. Prior to the measurement, the sheet is stored at a temperature of 23° C. for two weeks. When the measurement is carried out, three sheets are overlaid. A sheet consisting of the thermoplastic polyurethane elastomer alone may be used for the measurement.

The thickness Tc of the cover 6 is not limited. In light of the resilience performance, the thickness Tc is preferably equal to or less than 2.5 mm, more preferably equal to or less than 2.2 mm, and still more preferably equal to or less than 1.8 mm. In light of the durability, the thickness Tc is preferably equal to or greater than 0.6 mm, more preferably equal to or greater than 0.8 mm, and still more preferably equal to or greater than 1.0 mm.

Although the paint layer may not be necessarily provided, it is preferred that one or more paint layer be provided. In light of the productivity, it is preferred to provide one paint layer. In light of the durability, the paint layer 12 has a thickness of preferably equal to or greater than 2 μm, more preferably equal to or greater than 3 μm, and still more preferably equal to or greater than 5 μm. When the paint layer 12 is too thick, paint pool or the like is likely to be yielded, whereby ununiform appearance, and deterioration of the appearance and color tone are often found. In light of achievement of favorable appearance, the paint layer 12 has a thickness of preferably equal to or less than 30 μm, more preferably equal to or less than 20 μm, and still more preferably equal to or less than 15 μm.

The paint layer 12 may be either a clear paint layer or an enamel paint layer, but a clear paint layer is preferred. The resin component in the paint layer 12 is not limited. Examples of the resin component include acrylic resins, epoxy resins, polyurethane resins, polyester resins, cellulose based resins and the like. As the paint layer, a two-component cured polyurethane resin described later is preferred. The two-component cured polyurethane resin can yield a paint layer that is even more excellent in the durability.

The two-component cured polyurethane is obtained by a reaction of a base material and a curing agent. The two-component cured polyurethane prepared by a reaction of a base material containing a polyol component with a curing agent containing polyisocyanate (including a polyisocyanate derivative) is preferred.

It is preferred that urethane polyol be used as the polyol component of the base material. The urethane polyol has urethane bonds and at least two hydroxyl groups. Preferably, the urethane polyol has a hydroxyl groups at its end. The urethane polyol may be obtained by allowing polyol and polyisocyanate to react at a ratio by which an excess molar ratio of the hydroxyl groups of the polyol component to the isocyanate groups of polyisocyanate is provided.

The polyol for use in production of the urethane polyol has multiple hydroxyl groups. Polyols having a weight average molecular weight of 50 or greater and 2,000 or less, and particularly 100 or greater and 1,000 or less are preferred. Examples of the polyol having a low molecular weight include diols and triols. Specific examples of the diol include ethylene glycol, diethylene glycol, triethylene glycol, 1,3-butanediol, 1,4-butanediol, neopentyl glycol and 1,6-hexanediol. Specific examples of the triol include glycerin, trimethylolpropane and hexanetriol. Examples of the polyol having a high molecular weight include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PHMA); lactone based polyester polyols such as poly-ε-caprolactone (PCL); polycarbonate polyols such as polyhexamethylene carbonate; and acrylic polyols. Two or more kinds of the polyols may be used in combination.

The polyisocyanate for use in production of the urethane polyol has multiple isocyanate groups. Specific examples of the polyisocyanate include aromatic polyisocyanates such as 2,4-toluene diisocyanate, 2,6-toluene diisocyanate, mixtures of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI) and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI) and isophorone diisocyanate (IPDI); and aliphatic polyisocyanates such as hexamethylene diisocyanate (HDI). Two or more polyisocyanates may be used in combination. In light of the weather resistance, TMXDI, XDI, HDI, $H_6$XDI, IPDI and $H_{12}$MDI are preferred.

In the reaction of the polyol and polyisocyanate for producing the urethane polyol, any known catalyst can be used. Typical catalyst may be dibutyltin dilaurate.

The proportion of the urethane bonds included in the urethane polyol is preferably 0.1 mmol/g or greater and 5 mmol/g or less. When this proportion is equal to or greater than 0.1 mmol/g, the paint layer 12 that is excellent in the scuff resistance can be formed. When this proportion is equal to or less than 5 mmol/g, the paint layer 12 that is excellent in the following capability to the cover can be formed. The paint layer 12 that is excellent in the following capability is less likely to be cracked in repeated hitting of the golf ball. The proportion of the urethane bonds may be adjusted to fall within the above range by regulating the molecular weight of the polyol to be the raw material. The proportion of the urethane bonds may be adjusted to fall within the above range also by regulating compounding ratio of the polyol and the polyisocyanate.

In light of a short time period required for the reaction of the base material with the curing agent, the urethane polyol has a weight average molecular weight of preferably equal to or greater than 4,000, and more preferably equal to or greater than 4,500. In light of the adhesiveness between the paint layer 12 and the cover, the weight average molecular weight is preferably equal to or less than 10,000, and more preferably equal to or less than 9,000.

In light of the adhesiveness of the paint layer 12 to the cover, the urethane polyol has a hydroxyl value (mg KOH/g) of preferably equal to or greater than 15, and more preferably equal to or greater than 73. In light of a short time period required for the reaction of the base material with the curing agent, and inhibition of cracking, the hydroxyl value is preferably equal to or less than 130, and more preferably equal to or less than 120.

The base material may contain, in addition to the urethane polyol, a polyol not having any urethane bond. The aforementioned polyol as the raw material of the urethane polyol may be used in the base material. Polyols that are miscible with the urethane polyol are preferred. In light of a short time period required for the reaction of the base material with the curing agent, the proportion of the urethane polyol in the base material is preferably equal to or greater than 50% by weight, and more preferably equal to or greater than 80% by weight based on the solid content. Ideally, this proportion is 100% by weight.

The curing agent contains polyisocyanate or a derivative thereof. The aforementioned polyisocyanate as the raw material of the urethane polyol may be used in the curing agent.

The cover 6 includes a heat and light resistance stabilizer. This heat and light resistance stabilizer can suppress deterioration of the thermoplastic polyurethane elastomer as a base polymer of the cover 6 by light, and can also inhibit the thermal deterioration.

This heat and light resistance stabilizer is a hindered amine heat and light resistance stabilizer. This hindered amine heat and light resistance stabilizer has a hindered phenol group. It was revealed that this hindered amine heat and light resistance stabilizer can improve the weather resistance of the cover 6, particularly can reduce the weathering color change likelihood.

It is believed that radicals generated by heat and/or light are involved in the deterioration of thermoplastic polyurethane elastomers. The radical is considered to cause a chain reaction, whereby the deterioration is accelerated. For example, radicals generated by cleavage of urethane bonds by ultraviolet rays cleave the molecular chain by a chain reaction, and thus the elastomer is deteriorated. In addition, parts derived from an aromatic isocyanate can be converted into radicals by ultraviolet rays. Thus formed radical can result in generation of quinoneimide. Since the quinoneimide is a coloring substance, generation of the quinoneimide can contribute to color change.

It is believed that the radical generated by heat can be efficiently captured by the hindered amine heat and light resistance stabilizer having a hindered phenol group. In addition, the hindered amine heat and light resistance stabilizer having a hindered phenol group is believed to efficiently capture the radical generated by light. The capture of the radical can lead to inhibition of the chain reaction. Therefore, it is considered that the capture of the radical inhibits deterioration of the elastomer.

Preferably, this hindered amine heat and light resistance stabilizer has two or more hindered phenol groups in the molecule. In other words, this hindered amine heat and light resistance stabilizer has two or more hindered phenol groups in the structure formula. The effect of capturing the radical is believed to be enhanced by having two or more hindered phenol groups.

The hindered amine heat and light resistance stabilizer is not limited. One kind of hindered amine heat and light resistance stabilizer may be used, or two or more may be used in combination. As the hindered amine heat and light resistance stabilizer having one hindered phenol group in the molecule, bis(1,2,2,6,6-pentamethyl-4-piperidyl)[[3,5-bis(1,1-dimethylethyl)-4-hydroxyphenyl]methyl]butylmalonate] may be illustrated. As the hindered amine heat and light resistance stabilizer having two hindered phenol groups in the molecule, 1-[2-[3-(3,5-di-t-butyl-4-hydroxyphenyl)propionyloxy] ethyl]-4-[3-(3,5-di-t-butyl-4-hydroxyphenyl)propionyloxy]-2,2,6,6-tetramethylpiperidine may be illustrated. In light of inhibition of the color change of the cover, 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine is particularly preferred.

As the hindered amine heat and light resistance stabilizer having a hindered phenol group, trade name "Sanol LS-2626" and trade name "TINUVIN 144" manufactured by Ciba Specialty Chemicals plc. may be illustrated. "Sanol LS-2626" is a product name of 1-[2-[3-(3,5-di-t-butyl-4-hydroxyphenyl) propionyloxy]ethyl]-4-[3-(3,5-di-t-butyl-4-hydroxyphenyl) propionyloxy]-2,2,6,6-tetramethylpiperidine. "TINUVIN 144" is a product name of bis(1,2,2,6,6-pentamethyl-4-piperidyl)[[3,5-bis(1,1-dimethylethyl)-4-hydroxyphenyl]methyl]butylmalonate].

The heat and light resistance stabilizer has a hindered amine group and a hindered phenol group in its molecular skeleton. The hindered amine group can exert an effect as a light stabilizer. The hindered phenol group can exert an effect as a heat resistance stabilizer. Use of this heat and light resistance stabilizer enables the amount of the used light stabilizer or heat resistance stabilizer to be reduced. Alternatively, use of this heat and light resistance stabilizer can obviate the use of the light stabilizer or the heat resistance stabilizer. Therefore, the heat and light resistance stabilizer can contribute to reduction of the cost.

In light of inhibition of the color change of the cover 6, the hindered amine heat and light resistance stabilizer having a hindered phenol group is included in an amount of preferably equal to or greater than 0.1 parts by weight, more preferably equal to or greater than 0.2 parts by weight, and still more preferably equal to or greater than 0.3 parts by weight per 100 parts by weight of the base polymer of the cover 6. In light of the scuff resistance and cost, the hindered amine heat and light resistance stabilizer having a hindered phenol group is included in an amount of preferably equal to or less than 10 parts by weight, more preferably equal to or less than 9 parts by weight, and still more preferably equal to or less than 8 parts by weight per 100 parts by weight of the base polymer of the cover 6.

Preferably, the cover 6 includes an ultraviolet ray absorbing agent. One kind of the ultraviolet ray absorbing agent may be used, or two or more may be used in combination. This ultraviolet ray absorbing agent is not limited. Illustrative examples of the ultraviolet ray absorbing agent include salicylic acid derivatives, benzophenone based agents, benzotriazole based agents, cyanoacrylate based agents, triazine based agents, nickel complexes, and the like. Examples of the salicylic acid derivative include phenyl salicylate, p-t-butylphenyl salicylate, p-octylphenyl salicylate and the like. Examples of the benzophenone based agent include 2,4-dihydroxybenzophenone, 2-hydroxy-4-methoxybenzophenone, 2-hydroxy-4-octoxybenzophenone, 2,2-dihydroxy-4,4'-methoxybenzophenone and the like. Examples of the benzotriazole based agent include 2-(2'-hydroxy-5'-methylphenyl)benzotriazole, 2-(2'-hydroxy-5'-t-butylphenyl)benzotriazole, 2-(2-hydroxy-3'-t-butyl-5'-methylphenyl)-5-chlorobenzotriazole, 2-[2-hydroxy-3,5-bis(α,α-dimethylbenzyl)phenyl]-2H-benzotriazole, 2-(5-methyl-2-hydroxyphenyl)benzotriazole and the like, but not limited thereto. Examples of the cyanoacrylate based agent include 2-ethylhexyl-2-cyano-3,3-diphenyl acrylate, ethyl-2-cyano-3,3'-diphenyl acrylate and the like, but not limited thereto. Examples of the triazine based agent include 2-(4,6-diphenyl-1,3,5-triazine-2-yl)-5[(hexyl)oxy]-phenol, 2,4-bis(2-hydroxy-4-butyroxyphenyl]-6-(2,4-bis-butyroxyphenyl)-1,3-5-triazine and 2-[4-[(2-hydroxy-3-(2'-ethyl)hexyl)oxy]-2-hydroxyphenyl]-4,6-bis(2,4-dimethylphenyl)-1,3,5-triazine, but not limited thereto. Specifically, the benzophenone based agent may be Sumisoap 130, Sumisoap 140 or the like manufactured by Sumitomo Chemical Co., Ltd.; the benzotriazole based agent may be "TINUVIN 234", "TINUVIN 900", "TINUVIN 326", "TINUVIN P" or the like manufactured by Ciba Specialty Chemicals plc.; and the cyanoacrylate based agent may be "Uvinul N-35" or the like manufactured by BASF Corporation. The triazine based agent may be "TINUVIN 1577", "TINUVIN 460", "TINUVIN 405" or the like manufactured by Ciba Specialty Chemicals plc.

In light of inhibition of the color change of the cover 6, the ultraviolet ray absorbing agent included in the cover 6 can preferably absorb an ultraviolet ray of 240 to 400 nm. The ultraviolet ray absorbing agent included in the cover 6 is preferably a salicylic acid derivative, a triazine based agent, a benzophenone based agent, a benzotriazole based agent and a cyanoacrylate based agent, and particularly preferably a benzotriazole based agent.

In light of inhibition of the color change of the cover 6, the content of the ultraviolet ray absorbing agent in the cover 6 is preferably equal to or greater than 0.01 parts by weight, more preferably equal to or greater than 0.1 parts by weight, and still more preferably equal to or greater than 1 part by weight per 100 parts by weight of the base polymer. In light of improvement of the color tone in appearance and scuff resistance, and reduction of the cost, the content of the ultraviolet ray absorbing agent in the cover 6 is preferably equal to or less than 10 parts by weight, and more preferably equal to or less than 5 parts by weight per 100 parts by weight of the base polymer.

The cover 6 may also include a heat resistance stabilizer. The heat resistance stabilizer has an effect of inhibiting heat deterioration. The heat resistance stabilizer does not substantially have an effect of inhibiting the deterioration by light.

The heat resistance stabilizer is not limited. As the heat resistance stabilizer, for example, a hindered phenol heat resistance stabilizer, an amine based heat resistance stabilizer, a phosphorus based heat resistance stabilizer, a sulfur heat resistance stabilizer and the like may be illustrated.

Examples of the hindered phenol based heat resistance stabilizer include e.g., pentaerythritol tetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenylpropionamide)], benzenepropionic acid 3,5-bis(1,1-dimethylethyl)-4-hydroxy, C7-C9 side chain alkyl esters, 3,3',3",5,5',5"-hexa-tert-butyl-a,a',a"-(mesitylene-2,4,6-triyl)tri-p-cresol, calcium diethylbis[[[3,5-bis(1,1-dimethylethyl)-4-hydroxyphenyl]methyl]phosphonate], a mixture of calcium diethylbis[[[3,5-bis(1,1-dimethylethyl)-4-hydroxyphenyl]methyl]phosphonate] (50% by weight) and polyethylene wax (50% by weight), 4,6-bis(octylthiomethyl)-o-cresol, 4,6-bis(dodecylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, a reaction product of N-phenylbenzeneamine and 2,4,4-trimethylpentene (CAS-No.: 68411-46-1), and 2,6-di-tert-butyl-4-(4,6-bis(octylthio)-1,3,5-triazine-2-ylamino)phenol.

As the phosphorus based heat resistance stabilizer, for example, tris(2,4-di-tert-butylphenyl)phosphite may be illustrated. Exemplary commercially available compound may be trade name "IRGAFOS 168" manufactured by Ciba Specialty Chemicals plc.

As the sulfur based heat resistance stabilizer, for example, didodecyl 3,3'-thiodipropionate, and dioctadecyl 3,3'-thiodipropionate may be illustrated. Exemplary commercially available product of didodecyl 3,3'-thiodipropionate may be trade name "IRGANOX PS 800 FD" manufactured by Ciba Specialty Chemicals plc. Exemplary commercially available product of dioctadecyl 3,3'-thiodipropionate may be trade name "IRGANOX PS 802 FD" manufactured by Ciba Specialty Chemicals plc.

In light of high synergistic effect with the aforementioned hindered amine heat and light resistance stabilizer, a hindered phenol heat resistance stabilizer is preferred, and N,N'-hexane-1,6-diylbis[3-(3,5-di-tert-butyl-4-hydroxyphenylpropionamide)] is more preferred.

Examples of commercially available hindered phenol heat resistance stabilizer include e.g., trade names "IRGANOX 1010", "IRGANOX 1035", "IRGANOX 1076", "IRGANOX 1098", "IRGANOX 1135", "IRGANOX 1330", "IRGANOX 1425 WL", "IRGANOX 1520 L", "IRGANOX 1726", "IRGANOX 245", "IRGANOX 259", "IRGANOX 3114", "IRGANOX 3790", "IRGANOX 5057" and "IRGANOX 565" manufactured by Ciba Specialty Chemicals plc.

"IRGANOX 1010" is a product name of pentaerythritol tetrakis[3-(3,5-di-tert-butyl-4-hydroxyphenyl)propionate]. "IRGANOX 1035" is a product name of thiodiethylenebis[3-(3,5-di-tert-butyl-4-hydroxyphenyl)propionate]. "IRGANOX 1076" is a product name of octadecyl-3-(3,5-di-tert-butyl-4-hydroxyphenyl)propionate. "IRGANOX 1098" is a product name of N,N'-hexane-1,6-diylbis[3-(3,5-di-tert-butyl-4-hydroxyphenylpropionamide)]. "IRGANOX 1135" is a product name of benzenepropionic acid 3,5-bis(1,1-dimethylethyl)-4-hydroxy, C7-C9 side chain alkyl ester. "IRGANOX 1330" is a product name of 3,3',3",5,5',5"-hexa-tert-butyl-a,a',a"-(mesitylene-2,4,6-triyl)tri-p-cresol.

"IRGANOX 1425 WL" is a product name of a mixture of calcium diethylbis[[[3,5-bis(1,1-dimethylethyl)-4-hydroxyphenyl]methyl]phosphonate] (50% by weight) and polyethylene wax (50% by weight). "IRGANOX 1520 L" is a product name of 4,6-bis(octylthiomethyl)-o-cresol. "IRGANOX 1726" is a product name of 4,6-bis(dodecylthiomethyl)-o-cresol. "IRGANOX 245" is a product name of ethylenebis(oxyethylene)bis[3-(5-tert-butyl-4-hydroxy-m-tolyl)propionate]. "IRGANOX 259" is a product name of hexamethylenebis[3-(3,5-di-tert-butyl-4-hydroxyphenyl)propionate. "IRGANOX 3114" is a product name of 1,3,5-tris(3,5-di-tert-butyl-4-hydroxybenzyl)-1,3,5-triazine-2,4,6 (1H,3H,5H)-trione. "IRGANOX 3790" is a product name of 1,3,5-tris[(4-tert-butyl-3-hydroxy-2,6-xylyl)methyl]-1,3,5-triazine-2,4,6(1H,3H,5H)-trione. "IRGANOX 5057" is a product name of a reaction product of N-phenylbenzeneamine and 2,4,4-trimethylpentene (CAS-No.: 68411-46-1). "IRGANOX 565" is a product name of 2,6-di-tert-butyl-4-(4,6-bis(octylthio)-1,3,5-triazine-2-ylamino)phenol.

Conventionally, autoxidation of the cover due to light has been believed to be more greatly affected than autoxidation due to heat. In Prior Arts, protection of the cover from autoxidation caused by exposure to ultraviolet rays for a long period of time has been attempted by use of an ultraviolet ray absorbing agent in combination with a light stabilizer. Any golf ball having a cover that includes a heat resistance stabilizer has not been proposed so far.

The heat resistance stabilizer can not only be effective in preventing oxidation by heat, but also serve in protecting the cover from autoxidation resulting from the exposure to ultraviolet rays for a long period of time. Therefore, it is efficacious to combine an ultraviolet ray absorbing agent or a light stabilizer which can exhibit the effect just for a short period of time, with the heat resistance stabilizer which can exhibit the effect for a long period of time. This combination can lead to inhibition of autoxidation resulting from the exposure to ultraviolet rays for both long and short time periods. The aforementioned "hindered amine heat and light resistance stabilizer having a hindered phenol group" has, in addition to the hindered amine group that exhibits the effect as a light stabilizer, a hindered phenol group that can exhibit the effect as a heat resistance stabilizer. Accordingly, light stability for a long period of time can be achieved without using other light stabilizer and/or other heat resistance stabilizer. Alternatively, even though a smaller amount of the other light stabilizer or the other heat resistance stabilizer is used, light stability for a long period of time may be achieved. Thus, the cost can be reduced, and golf balls suited as range balls can be attained.

Provided that: the molar concentration of the hindered amine heat and light resistance stabilizer is defined as A; the molar concentration of the ultraviolet ray absorbing agent is defined as B; and the molar concentration of the heat resistance stabilizer is defined as C, the molar ratio (A/B) and the molar ratio [(A+C)/B] are preferably as follows.

In light of concomitant achievement of both a long-term inhibitory effect of color change and a short-term inhibitory effect of color change, the molar ratio (A/B) is preferably equal to or greater than 0.01, more preferably equal to or greater than 0.05, and still more preferably equal to or greater than 0.1. In light of concomitant achievement of both a long-term inhibitory effect of color change and a short-term inhibitory effect of color change, the molar ratio (A/B) is preferably equal to or less than 2.5, more preferably equal to or less than 2.4, and still more preferably equal to or less than 2.3. The functions of the hindered amine heat and light resistance stabilizer and the ultraviolet ray absorbing agent are expressed by their specified group in the molecule. Therefore, it is significant that the compounding ratio is defined not by weight ratio but by molar ratio. The hindered amine heat and light resistance stabilizer has a molecular weight different from that of the ultraviolet ray absorbing agent. More appropriate proportion of the compounds having the different molecular weight shall be the molar ratio rather than the weight ratio.

In light of concomitant achievement of both the long-term inhibitory effect of color change and the short-term inhibitory effect of color change, the molar ratio [(A+C)/B] is preferably equal to or greater than 0.01, more preferably equal to or greater than 0.05, and still more preferably equal to or greater than 0.1. In light of concomitant achievement of both the long-term inhibitory effect of color change and the short-term inhibitory effect of color change, the molar ratio [(A+C)/B] is preferably equal to or less than 2.5, more preferably equal to or less than 2.4, and still more preferably equal to or less than 2.3. The functions of the hindered amine heat and light resistance stabilizer, the heat resistance stabilizer and the ultraviolet ray absorbing agent are expressed by their specified group in the molecule. Therefore, it is significant that the compounding ratio is defined not by weight ratio but by molar ratio. The hindered amine heat and light resistance stabilizer, the heat resistance stabilizer and the ultraviolet ray absorbing agent have a molecular weight different from each other. More appropriate proportion of the compounds having the different molecular weight shall be the molar ratio rather than the weight ratio.

EXAMPLES

Hereinafter, advantages of the present invention will be explained by way of Examples, however, the present invention should not be construed as being limited based on the description of the Examples.

Example 1

A rubber composition was obtained by kneading 100 parts by weight of polybutadiene synthesized using a rare-earth element based catalyst (trade name "BR-730", available from JSR Corporation), 32 parts by weight of zinc diacrylate, 5 parts of zinc oxide, an adequate amount of barium sulfate, 0.5 parts by weight of diphenyl disulfide and 0.7 parts by weight of dicumyl peroxide (NOF Corporation). The compounded composition of the rubber composition is shown in Table 1 below. This rubber composition was placed into a mold having upper and lower mold half each having a hemispherical cavity, and heated at 170° C. for 30 minutes to obtain a core. The core had a diameter of 39.6 mm. The amount of compressive deformation Ch of the core was 3.4 mm. On the other hand, 100 parts by weight of a thermoplastic polyurethane elastomer ("Elastolan 1195ATR" supra), 0.5 parts by weight of a benzotriazole based ultraviolet ray absorbing agent ("TINUVIN P" supra), 4 parts by weight of a hindered amine heat and light resistance stabilizer ("Sanol LS-2626" supra) and 3 parts by weight of titanium oxide were kneaded to obtain a resin composition. The core was placed into a final mold having numerous pimples on the inside face, followed by injection of the aforementioned resin composition around the core by injection molding to form a cover. The cover had a thickness of 1.6 mm. Numerous dimples having a shape inverted from the shape of the pimple were formed on the cover. A paint layer was formed around the cover to obtain a golf ball of Example 1. This golf ball had a diameter of 42.8 mm, and a weight of 45.4 g. Specifications and results of evaluation of Example 1 are presented in Table 2 below.

"TINUVIN P" is a product name of 2-(5-methyl-2-hydroxyphenyl)benzotriazole. "TINUVIN P" has a molecular weight of 225. "Sanol LS-2626" has a molecular weight of 722.

Examples 2 to 4 and Comparative Examples 1 to 3

Golf balls of Examples 2 to 4 and Comparative Examples 1 to 3 were obtained in a similar manner to Example 1 except that the compositions of the cover were as shown in Table 2 below. Specifications and results of evaluation are presented in Table 2 below.

In Examples 2 to 4 and Comparative Examples 1 to 3, "IRGANOX 1098" described above was used. This "IRGANOX 1098" has a molecular weight of 637.

Comparative Example 4

Golf ball of Comparative Example 4 was obtained in a similar manner to Example 1 except that the composition of the cover was as shown in Table 2 below. Specifications and results of evaluation are presented in Table 2 below.

In Comparative Example 4, ionomer was used as the base polymer of the cover. Trade names "Himilan 1555", "Himilan 1557" and "Himilan 1855" available from Du Pont-MITSUI POLYCHEMICALS Co., Ltd. were used as the ionomer.

In all Examples and Comparative Examples, the weight of the ball was adjusted to 45.4 g by altering the specific gravity of the core. The specific gravity of the core was regulated by way of the amount of blended barium sulfate.

Measurement of Cover Hardness (Shore-D)

A sheet consisting of the resin composition of the cover was produced, and subjected to the measurement. The measurement was carried out in accordance with a standard of "ASTM-D 2240-68" by the method as described above. The results are presented in Table 2 below.

Scuff Resistance Performance

An iron club (trade name "XXIO" available from SRI Sports Limited, shaft: S, category: sand wedge) was attached to a swing machine available from Golf Laboratories, Co., Ltd. The golf ball was hit under the condition to provide a head speed of 36 m/sec, and the extent of scuff was visually inspected. Evaluation results integrated from the tests conducted 20 times are presented in Table 2 below. The extent of the scuff was evaluated according to the following standards on the grade of four:

"A": favorable;
"B": somewhat favorable;
"C": somewhat inferior; and
"D": inferior.

Weathering Color Change Likelihood

Weather resistance test was carried out in which an ultraviolet ray was irradiated with Sunshine Super Long-life Weather Meter (type WEL-SUN-HC/B) manufactured by Suga Test Instrument Co., Ltd. The test conditions complied with JIS D0205, involving: temperature in the bath of 63° C.; humidity of 50%; and rainfall condition of "raining for 12 min in a period of 60 min". Indices $L^*$, $a^*$ and $b^*$ were measured at the same measurement point prior to the weather resistance test, following the weather resistance test for 24 hrs and following the weather resistance test for 120 hrs. The difference of each of the indices $\Delta L$, $\Delta a$ and $\Delta b$ before and after exposing to the weathering condition was calculated. Thereafter, $\Delta E$ was calculated by the following formula. The $\Delta E$ derived from the weather resistance test for 24 hrs, and the $\Delta E$ derived from the weather resistance test for 120 hrs are presented in Table 2 below.

$$\Delta E = [(\Delta L)^2 + (\Delta a)^2 + (\Delta b)^2]^{1/2}$$

For the measurement of the indices $L^*$, $a^*$ and $b^*$, Spectrophotometer "CM-3500d" available from Konica Minolta Co., Ltd. was used. The light receiver was applied on the surface of the golf ball (surface of the paint layer), whereby the measurement was carried out. A "standard light $D_{65}$" was employed as a light source. The color temperature of this light source was 6504 k. The spectral sensitivity employed was "2° field of view".

The indices $L^*$, $a^*$ and $b^*$ are the indices $L^*$, $a^*$, and $b^*$ in the CIELAB color coordinate system. The indices $L^*$, $a^*$ and $b^*$ are calculated according to the following formulae:

$$L^* = 116(Y/Yn)^{1/3} - 16;$$

$$a^* = 500((X/Xn)^{1/3} - (Y/Yn)^{1/3}); \text{ and}$$

$$b^* = 200((Y/Yn)^{1/3} - (Z/Zn)^{1/3}).$$

In these formulae, X, Y and Z represent three psychophysical color specifications in the XYZ color coordinate system, while Xn, Yn and Zn represent three psychophysical color specifications on a perfect reflecting diffuser. The CIELAB color coordinate system conforms to a standard determined by Commission Internationale de l'Echairage (CIE) in 1976. In Japan, the CIELAB color coordinate system is employed in "JIS Z 8729". $L^*$ is an index of brightness. The $a^*$ and $b^*$ are indices that correlate with color and chroma saturation. The increasing negative values of $a^*$ indicate green direction, while the increasing positive values thereof indicate red direction. The increasing negative values of $b^*$ indicate blue direction, while the increasing positive values thereof indicate yellow direction.

TABLE 1

| Compounded Composition of Core in Examples and Comparative Examples (parts by weight) | |
|---|---|
| BR-730 | 100 |
| Zinc diacrylate | 32 |
| Zinc oxide | 5 |
| Barium sulfate | adequate amount |
| DPDS | 0.5 |
| DCP | 0.7 |

TABLE 2

Specifications and Evaluation Results of Examples and Comparative Examples

|  |  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Compounded composition of cover | resin (parts by weight) | Elastolan 1195ATR | 100 | 100 | 100 | 100 | 100 | 100 | 100 | — |
|  |  | Himilan 1555 | — | — | — | — | — | — | — | 10 |
|  |  | Himilan 1557 | — | — | — | — | — | — | — | 10 |
|  |  | Himilan 1855 | — | — | — | — | — | — | — | 80 |
|  | UV absorbing agent (parts by weight) | TINUVIN P | 0.5 | 0.5 | 2 | 2 | 0.5 | 0.5 | 0.5 | — |
|  | heat and light resistance stabilizer (parts by weight) | Sanol LS2626 | 4 | 1 | 4 | 0.5 | — | 0.05 | 11 | 0.2 |
|  | heat resistance stabilizer (parts by weight) | IRGANOX 1098 | — | 2.6 | 0.5 | 5 | 0.5 | 0.5 | 0.5 | — |
|  | pigment (parts by weight) | Titanium oxide | 3 | 3 | 3 | 3 | 3 | 3 | 3 | 3 |
| Physical properties of ball | molar ratio | A/B | 2.493 | 0.623 | 0.623 | 0.078 | — | 0.031 | 6.856 | — |
|  |  | (A + C)/B | 2.493 | 2.460 | 0.712 | 0.961 | 0.353 | 0.384 | 7.209 | — |
|  | weathering color change | ΔE (24 hrs) | 5 | 5 | 4 | 4 | 7 | 6 | 5 | 4 |
|  |  | ΔE (120 hrs) | 7 | 8 | 6 | 6 | 14 | 12 | 7 | 5 |
|  | cover hardness (Shore-D) |  | 47 | 47 | 47 | 47 | 47 | 47 | 47 | 50 |
|  | scuff resistance |  | A | A | A | A | A | A | C | C |

As shown in Table 2, the golf balls of Examples are excellent in terms of the weathering color change likelihood and scuff resistance performance. Therefore, advantages of the present invention are clearly suggested by these results of evaluation.

The golf ball according to the present invention is suited for the play at golf course, and practice in the driving range.

The foregoing description is just for illustrative examples, therefore, various modifications can be made in the scope without departing from the principles of the present invention.

What is claimed is:

1. A golf ball which comprises a core and a cover,
the base polymer of the cover comprising a thermoplastic polyurethane elastomer, and
the cover comprising 0.1 parts by weight or more and 10 parts by weight or less of a hindered amine heat and light resistance stabilizer having two or more hindered phenol groups, per 100 parts by weight of the base polymer, an ultraviolet ray absorbing agent, a heat resistance stabilizer, and titanium oxide; and
provided that if the molar concentration of the hindered amine heat and light resistance stabilizer is defined as A; the molar concentration of the ultraviolet ray absorbing agent is defined as B; and the molar concentration of the heat resistance stabilizer is defined as C,
the molar ratio (A/B) is 0.01 or greater and 2.5 or less,
while the molar ratio [(A+C)/B] is 0.01 or greater and 2.5 or less, and
wherein the cover has shore D hardness of 40 or greater and 55 or less.

2. The golf ball according to claim 1, wherein the principal component of the thermoplastic polyurethane elastomer is a reaction product of diphenylmethane diisocyanate (MDI) and polyether polyol.

3. The golf ball according to claim 1, wherein the cover comprises 0.01 parts by weight or more and 10 parts by weight or less of the ultraviolet ray absorbing agent per 100 parts by weight of the base polymer.

4. The golf ball according to claim 1, wherein the ultraviolet ray absorbing agent is a benzotriazole based agent.

5. The golf ball according to claim 1, wherein the heat resistance stabilizer is a hindered phenol based agent.

6. The golf ball according to claim 1, wherein the hindered amine heat and light resistance stabilizer is 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine.

7. The golf ball according to claim 1, wherein the ball is a range ball.

8. The golf ball according to claim 3, wherein the ultraviolet ray absorbing agent is a benzotriazole based agent.

9. The golf ball according to claim 8, wherein the heat resistance stabilizer is a hindered phenol based agent.

10. The golf ball according to claim 1, wherein the cover has shore D hardness of 42 or greater and 50 or less.

11. The golf ball according to claim 1, wherein the molar ratio (A/B) is 0.1 or greater and 2.3 or less, and the molar ratio [(A+C)/B] is 0.1 or greater and 2.3 or less.

12. The golf ball according to claim 9, wherein the molar ratio (A/B) is 0.1 or greater and 2.3 or less, and the molar ratio [(A+C)/B] is 0.1 or greater and 2.3 or less.

13. The golf ball according to claim 12, wherein the cover has shore D hardness of 42 or greater and 50 or less.

* * * * *